US012583445B2

(12) United States Patent
Kuroda et al.

(10) Patent No.: US 12,583,445 B2
(45) Date of Patent: Mar. 24, 2026

(54) VEHICLE CONTROLLER, METHOD, AND COMPUTER PROGRAM FOR VEHICLE CONTROL

(71) Applicant: TOYOTA JIDOSHA KABUSHIKI KAISHA, Toyota (JP)

(72) Inventors: Ryusuke Kuroda, Edogawa-ku (JP); Kenichiro Aoki, Machida (JP); Tadashi Okubo, Machida (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 188 days.

(21) Appl. No.: 18/234,944

(22) Filed: Aug. 17, 2023

(65) Prior Publication Data

US 2024/0067165 A1 Feb. 29, 2024

(30) Foreign Application Priority Data

Aug. 23, 2022 (JP) ................................. 2022-132509

(51) Int. Cl.
| | |
|---|---|
| *B60W 30/09* | (2012.01) |
| *B60W 30/095* | (2012.01) |
| *B60W 30/14* | (2006.01) |
| *B60W 30/16* | (2020.01) |
| *B60W 30/18* | (2012.01) |
| *B60W 50/00* | (2006.01) |
| *B60W 50/02* | (2012.01) |
| *B60W 50/029* | (2012.01) |
| *B60W 50/14* | (2020.01) |
| *B60W 60/00* | (2020.01) |

(52) U.S. Cl.
CPC ........ *B60W 30/09* (2013.01); *B60W 30/0956* (2013.01); *B60W 50/0205* (2013.01); *B60W 2050/0215* (2013.01); *B60W 2554/4041* (2020.02)

(58) Field of Classification Search
None
See application file for complete search history.

(56) References Cited

U.S. PATENT DOCUMENTS

| | | | | |
|---|---|---|---|---|
| 10,053,067 | B2 * | 8/2018 | Brandin ................ | B60W 30/08 |
| 10,479,274 | B2 * | 11/2019 | Park ....................... | G08G 1/162 |

(Continued)

FOREIGN PATENT DOCUMENTS

| | | |
|---|---|---|
| JP | 11-20498 A | 1/1999 |
| JP | 11-227495 A | 8/1999 |

(Continued)

*Primary Examiner* — Thomas E Worden
*Assistant Examiner* — Atticus A Cameron
(74) *Attorney, Agent, or Firm* — Dinsmore & Shohl LLP

(57) ABSTRACT

A vehicle controller includes a processor configured to sense trouble with a first sensor among sensors that are capable of detecting objects around a host vehicle and whose sensing areas at least partially overlap, detect another vehicle traveling in an area around the host vehicle, based on sensor signals from the respective sensors, and decelerate the host vehicle at first deceleration in the case where trouble with the first sensor is sensed and where the other vehicle is detected on the basis of a sensor signal from a second sensor having lower priority than the first sensor in sensing the other vehicle cutting in front of the host vehicle.

11 Claims, 7 Drawing Sheets

(56)                     References Cited

U.S. PATENT DOCUMENTS

| | | | |
|---|---|---|---|
| 2004/0001019 A1* | 1/2004 | Nakazawa | G01S 13/87 |
| | | | 342/70 |
| 2019/0225217 A1 | 7/2019 | Tsukada | |
| 2019/0315373 A1* | 10/2019 | Kondo | G07C 5/02 |
| 2020/0290632 A1 | 9/2020 | Hiruma | |

FOREIGN PATENT DOCUMENTS

| | | | |
|---|---|---|---|
| JP | 2019-099051 A | 6/2019 |
| JP | 2019-142246 A | 8/2019 |
| WO | 2018/061079 A1 | 4/2018 |

* cited by examiner

VEHICLE CONTROLLER, METHOD, AND COMPUTER PROGRAM FOR VEHICLE CONTROL

CROSS-REFERENCE TO RELATED APPLICATION

This application claims priority to Japanese Patent Application No. 2022-132509 filed on Aug. 23, 2022, the entire contents of which are herein incorporated by reference.

FIELD

The present disclosure relates to a vehicle controller, a method, and a computer program for controlling a vehicle.

BACKGROUND

A vehicle to which autonomous driving control is applicable detects objects around the vehicle with a sensor, and uses the result of detection for autonomous driving control. Thus, an error of such a sensor may make it difficult to execute autonomous driving control appropriately. In view of this, a technique to control a vehicle so as not to cause an accident even when a sensor used for detecting objects around the vehicle has trouble has been proposed (see Japanese Unexamined Patent Publication JP2019-99051A).

A device for recognizing surroundings described in JP2019-99051A executes speed control to decelerate a vehicle when an error of one of detectors for detecting objects in different regions is detected. The device determines whether there is an object in the detection region of the detector of which an error is detected, using information obtained from another of the detectors.

SUMMARY

Decelerating a vehicle by way of somewhat strong deceleration every time one of the sensors used for detecting objects around the vehicle has trouble increases the frequency of such deceleration control, which may cause discomfort to the driver of the vehicle.

It is an object of the present disclosure to provide a vehicle controller that can control a vehicle so that trouble with one of the sensors used for detecting objects around the vehicle may not cause danger and that can prevent discomfort to the driver of the vehicle.

According to an embodiment, a vehicle controller is provided and which includes a processor configured to: sense trouble with a first sensor among sensors that are capable of detecting objects around a host vehicle and whose sensing areas at least partially overlap, detect another vehicle traveling in an area around the host vehicle, based on sensor signals from the respective sensors, and decelerate the host vehicle at first deceleration in the case where trouble with the first sensor is sensed and where the other vehicle is detected on the basis of a sensor signal from a second sensor having lower priority than the first sensor in sensing the other vehicle cutting in front of the host vehicle among the sensors.

In some embodiments, the vehicle controller further includes a memory configured to store a danger area included in the sensing area of the second sensor and including a position at which the other vehicle may collide with the host vehicle in the event of cut-in of the other vehicle. In the case where trouble with the first sensor is sensed and where the position of the other vehicle is within the danger area, in some embodiments, the processor decelerates the host vehicle at second deceleration greater than the first deceleration until the other vehicle travels as fast as the host vehicle. In the case where trouble with the first sensor is sensed and where the position of the other vehicle is outside the danger area, in some embodiments, the processor decelerates the host vehicle at the first deceleration.

In this case, in some embodiments, the processor decelerates the host vehicle at the first deceleration after the speed of the host vehicle falls below the speed of the other vehicle in the danger area.

In addition, in some embodiments, the processor detects predetermined objects including the other vehicle, based on the sensor signals obtained from the first sensor. In some embodiments, the processor senses trouble with the first sensor in the case where frequency of detection of the predetermined objects in a most recent predetermined period is less than an expected value of frequency of detection of the predetermined objects from the sensor signals that are time-series signals obtained from the first sensor in the predetermined period by more than a certain degree.

According to another embodiment, a method for vehicle control is provided. The method includes sensing trouble with a first sensor among sensors that are capable of detecting objects around a host vehicle and whose sensing areas at least partially overlap; detecting another vehicle traveling in an area around the host vehicle, based on sensor signals from the respective sensors; and decelerating the host vehicle at first deceleration in the case where trouble with the first sensor is sensed and where the other vehicle is detected on the basis of a sensor signal from a second sensor having lower priority than the first sensor in sensing the other vehicle cutting in front of the host vehicle among the sensors.

According to still another embodiment, a non-transitory recording medium that stores a computer program for vehicle control is provided. The computer program includes instructions causing a processor mounted on a host vehicle to execute a process including sensing trouble with a first sensor among sensors that are capable of detecting objects around the host vehicle and whose sensing areas at least partially overlap; detecting another vehicle traveling in an area around the host vehicle, based on sensor signals from the respective sensors; and decelerating the host vehicle at first deceleration in the case where trouble with the first sensor is sensed and where the other vehicle is detected on the basis of a sensor signal from a second sensor having lower priority than the first sensor in sensing the other vehicle cutting in front of the host vehicle among the sensors.

The vehicle controller according to the present disclosure has an effect of being able to control a vehicle so that trouble with one of sensors used for detecting objects around the vehicle may not cause danger and to prevent making the driver of the vehicle uncomfortable.

DESCRIPTION OF EMBODIMENTS

A vehicle controller, a method for vehicle control executed by the vehicle controller, and a computer program for vehicle control will now be described with reference to the attached drawings. The vehicle controller detects another vehicle traveling in an area around a host vehicle, based on sensor signals of sensors that are capable of detecting objects around the host vehicle and whose sensing areas at least overlap. The vehicle controller decelerates the host vehicle in the case where trouble with a first sensor is sensed and where another vehicle is detected on the basis of a sensor signal from a second sensor among the sensors. The second sensor has lower priority than the first sensor in sensing another vehicle cutting in front of the host vehicle. In this way, the vehicle controller decelerates the host vehicle when not only is trouble with a sensor sensed but also another vehicle is detected on the basis of a sensor signal from another sensor, which enables reducing frequency of deceleration caused by trouble with a sensor. Thus the vehicle controller can control the host vehicle so that trouble with one of the sensors may not cause danger, and can prevent making the driver of the vehicle uncomfortable.

Examples of the vehicles are not limited to vehicles with four or more wheels, such as ordinary passenger cars and large-size vehicles, and include vehicles with three or less wheels, e.g., two-wheelers, such as motorcycles and bicycles.

Figure 1:
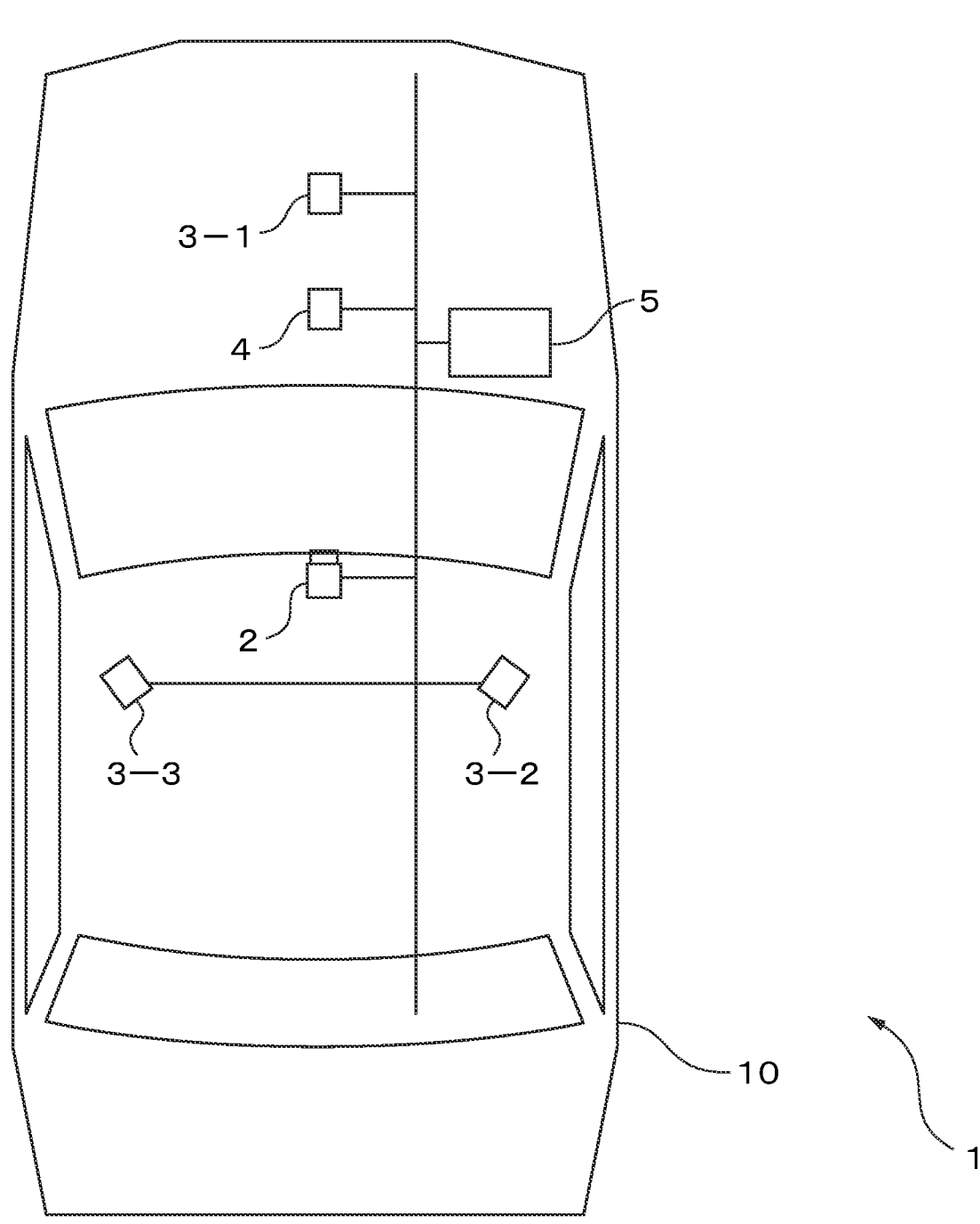
FIG. 1 schematically illustrates the configuration of a vehicle control system equipped with a vehicle controller.

FIG. 1 schematically illustrates the configuration of a vehicle control system equipped with the vehicle controller. The vehicle control system 1 is mounted on a vehicle 10 and controls the vehicle 10. To achieve this, the vehicle control system 1 includes a camera 2, three range sensors 3-1 to 3-3, a storage device 4, and an electronic control unit (ECU) 5, which is an example of the vehicle controller. The camera 2, the range sensors 3-1 to 3-3, and the storage device 4 are communicably connected to the ECU 5 via an in-vehicle network conforming to a standard such as a controller area network. The vehicle 10 is an example of the host vehicle. The vehicle control system 1 may further include a navigation device (not illustrated) for searching for a planned travel route to a destination, a GPS receiver (not illustrated) for determining the position of the vehicle 10, and a wireless communication terminal (not illustrated) for wireless communication with a device outside the vehicle 10.

The camera 2 is an example of a sensor capable of detecting objects around the vehicle 10. The camera 2 includes a two-dimensional detector constructed from an array of optoelectronic transducers, such as CCD or C-MOS, having sensitivity to visible light and a focusing optical system that forms an image of a target region on the two-dimensional detector. The camera 2 is mounted, for example, in the interior of the vehicle 10 so as to be oriented, for example, to the front of the vehicle 10. The camera 2 takes pictures of a region in front of the vehicle 10 every predetermined capturing period (e.g., $\frac{1}{30}$ to $\frac{1}{10}$ seconds), and generates images representing the region. Each image obtained by the camera 2 is an example of the sensor signal, and may be a color or grayscale image. The capture area of the camera 2 is an example of the sensing area of the sensor capable of detecting objects around the vehicle 10. The vehicle 10 may include two or more cameras taking pictures in different orientations or having different focal lengths. For example, the vehicle 10 may include a camera oriented to the rear of the vehicle 10, besides the camera 2. In addition, a camera having a focal length different from that of the camera 2 may be provided so as to take pictures of a region in front of the vehicle 10.

Every time an image is generated, the camera 2 outputs the generated image to the ECU 5 via the in-vehicle network.

The three range sensors 3-1 to 3-3 are another example of sensors capable of detecting objects around the vehicle 10. The range sensors 3-1 to 3-3 may be configured as, for example, LiDAR, radar, or sonar. For each bearing within a predetermined measurement area around the vehicle 10, the range sensors 3-1 to 3-3 generate ranging signals indicating the distance to an object in the bearing at predetermined intervals. Each ranging signal is another example of the sensor signal. The measurement areas of the range sensors 3-1 to 3-3 are another example of the sensing areas of the sensors capable of detecting objects around the vehicle 10. Each of the range sensors 3-1 to 3-3 is mounted on the vehicle 10 so that, for example, the measurement area of the range sensor at least overlaps the capture region of the camera 2 or the measurement areas of the other range sensors. The vehicle 10 may include four or more range sensors having different measurement areas, or the number of range sensors provided in the vehicle 10 may be one or two.

Every time a ranging signal is generated, the range sensors 3-1 to 3-3 each output the generated ranging signal to the ECU 5 via the in-vehicle network.

Figure 2:
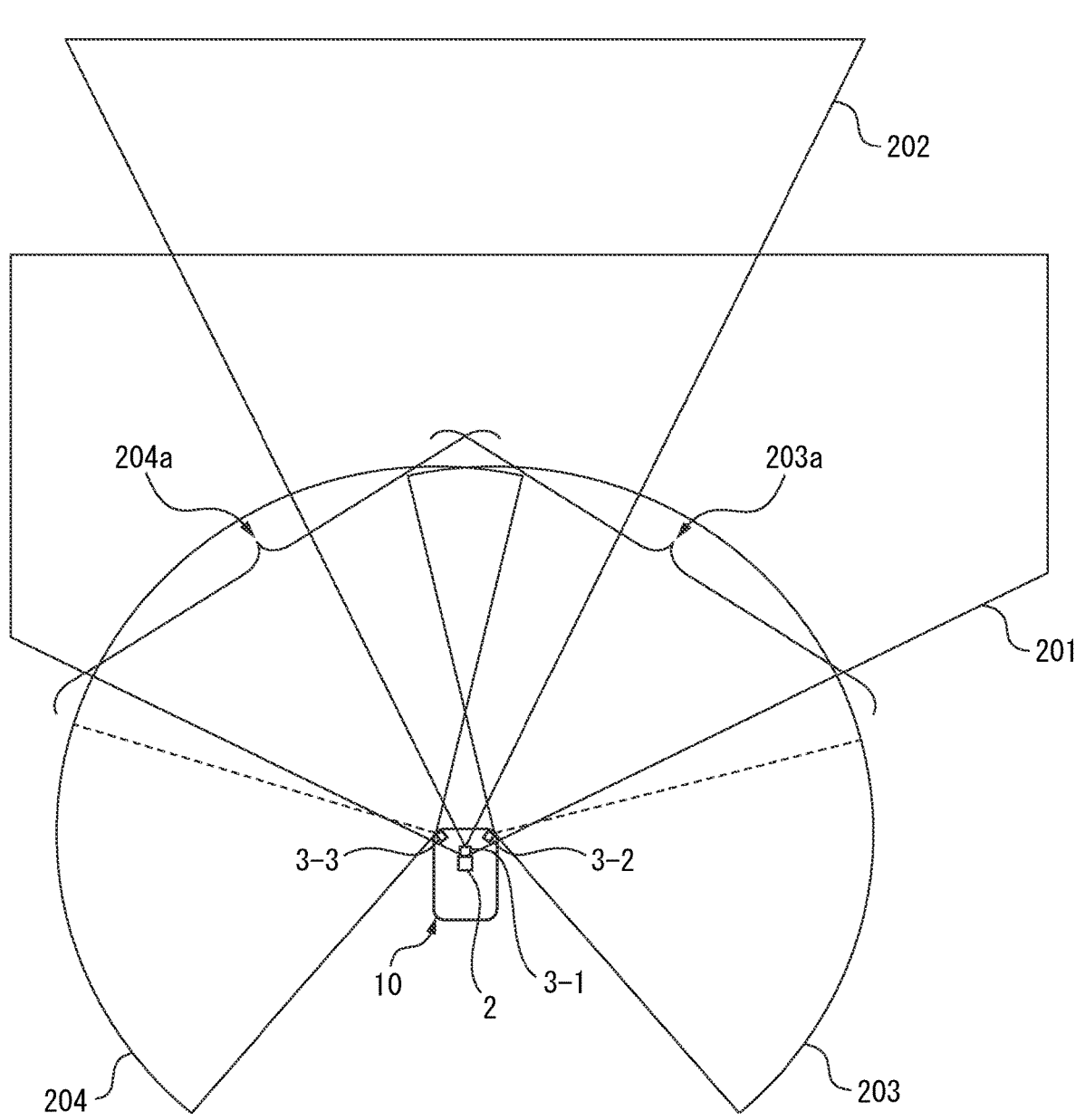
FIG. 2 schematically illustrates an example of the relationship between the capture area of a camera and the measurement areas of range sensors.

FIG. 2 schematically illustrates an example of the relationship between the capture area of the camera 2 and the measurement areas of the range sensors 3-1 to 3-3. As illustrated in FIG. 2, the camera 2 is mounted on the vehicle 10 so as to be oriented to the front of the vehicle 10; the capture area 201 of the camera 2 covers a region in front of the vehicle 10. Similarly, the range sensor 3-1 is also mounted on the vehicle 10 so as to be oriented to the front of the vehicle 10; the measurement area 202 of the range sensor 3-1 covers a region in front of the vehicle 10. Thus, the capture area 201 of the camera 2 overlaps the measurement area 202 of the range sensor 3-1.

In addition, the range sensor 3-2 is mounted on the vehicle 10 so as to be oriented to the right front of the vehicle 10; the measurement area 203 of the range sensor 3-2 covers an area from the right of the vehicle 10 to the front of the vehicle 10. In contrast, the range sensor 3-3 is mounted on the vehicle 10 so as to be oriented to the left front of the vehicle 10; the measurement area 204 of the range sensor 3-3 covers an area from the left of the vehicle 10 to the front of the vehicle 10. Thus, the measurement area 203 of the range sensor 3-2 partially overlaps the capture area 201 of the camera 2, the measurement area 202 of the range sensor 3-1, and the measurement area 204 of the range sensor 3-3. Similarly, the measurement area 204 of the range sensor 3-3 partially overlaps the capture area 201 of the camera 2, the measurement area 202 of the range sensor 3-1, and the measurement area 203 of the range sensor 3-2.

In sensing motions of traveling another vehicle around the vehicle 10, use of an image obtained by the camera 2 provides higher accuracy than use of a sensor signal of one of the range sensors 3-1 to 3-3. Thus, in sensing another vehicle cutting in front of the vehicle 10, the camera 2 is assigned higher priority than the range sensors 3-1 to 3-3. In other words, the camera 2 is an example of the first sensor whereas each of the range sensors 3-1 to 3-3 is an example of the second sensor.

The storage device 4, which is an example of the storage unit, includes, for example, a hard disk drive, a nonvolatile semiconductor memory, or an optical medium and an access device therefor. The storage device 4 stores a high-precision map, which is an example of map information. The high-precision map includes, for example, information indicating road markings, such as lane-dividing lines or stop lines, and traffic signs on individual roads within a predetermined region represented in the high-precision map as well as information indicating features around the roads (e.g., noise-blocking walls).

The storage device 4 may further include a processor for executing, for example, a process to update a high-precision map and a process related to a request from the ECU 5 to read out a high-precision map. In this case, for example, every time the vehicle 10 moves a predetermined distance, the storage device 4 transmits a request to obtain a high-precision map, together with the current position of the vehicle 10, to a map server via a wireless communication terminal (not illustrated), and receives a high-precision map of a predetermined region around the current position of the vehicle 10 from the map server via the wireless communication terminal. Upon receiving a request from the ECU 5 to read out a high-precision map, the storage device 4 cuts out that portion of a high-precision map stored therein which includes the current position of the vehicle 10 and which represents a region smaller than the predetermined region, and outputs the cutout portion to the ECU 5 via the in-vehicle network.

The ECU 5 is configured to control at least the speed of the vehicle 10 automatically. Alternatively, the ECU 5 may be configured to execute autonomous driving control of the vehicle 10.

Figure 3:
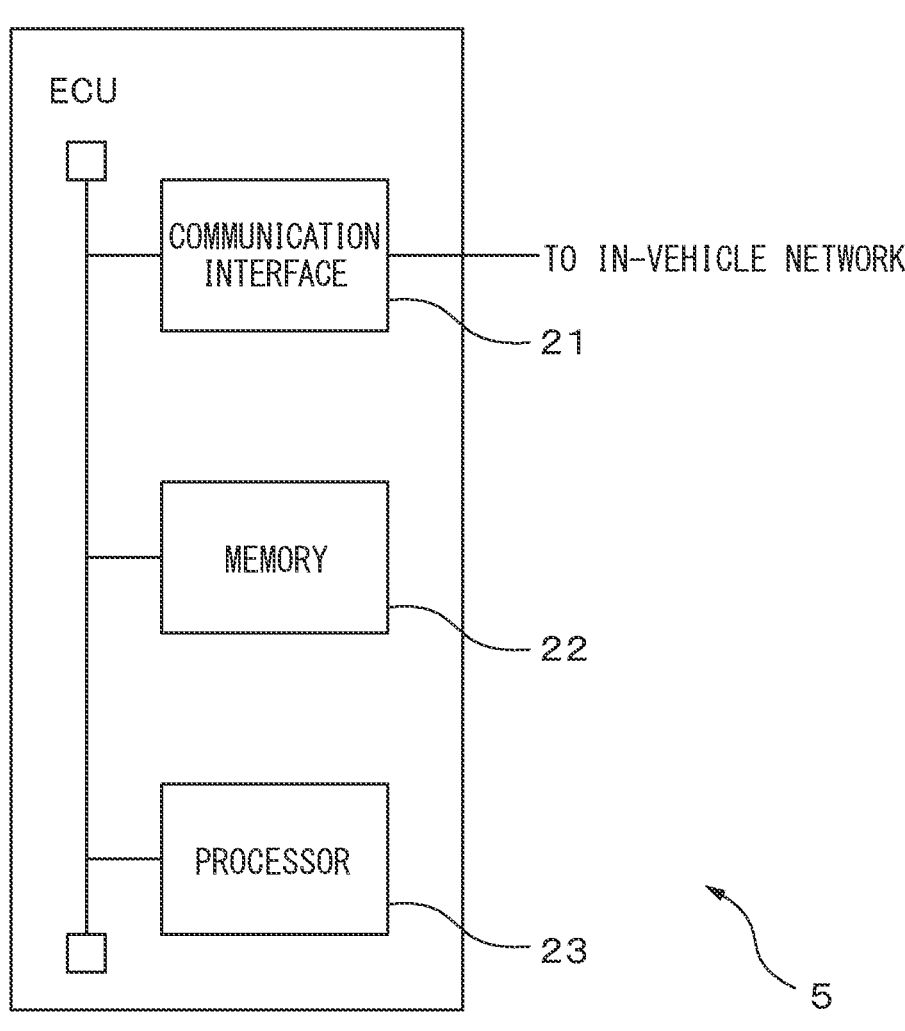
FIG. 3 illustrates the hardware configuration of an electronic control unit, which is an embodiment of the vehicle controller.

FIG. 3 illustrates the hardware configuration of the ECU 5, which is an example of the vehicle controller. As illustrated in FIG. 3, the ECU 5 includes a communication interface 21, a memory 22, and a processor 23. The communication interface 21, the memory 22, and the processor 23 may be configured as separate circuits or a single integrated circuit.

The communication interface 21 includes an interface circuit for connecting the ECU 5 to the in-vehicle network. Every time an image is received from the camera 2, the communication interface 21 passes the received image to the processor 23. Every time a ranging signal is received from one of the range sensors 3-1 to 3-3, the communication interface 21 passes the received ranging signal to the processor 23. Further, the communication interface 21 passes a high-precision map read from the storage device 4 to the processor 23.

The memory 22, which is another example of the storage unit, includes, for example, volatile and nonvolatile semiconductor memories, and stores various types of data used in a vehicle control process executed by the processor 23 of the ECU 5. For example, the memory 22 stores a high-precision map; parameters of the camera 2 indicating the focal length, the angle of view, the orientation, the mounted position, and the capture area; and the measurement areas of the range sensors 3-1 to 3-3. The memory 22 also stores a set of parameters for specifying a classifier for object detection used for detecting traveling another vehicle around the vehicle 10. In addition, the memory 22 temporarily stores sensor signals, such as images and ranging signals, and various types of data generated during the vehicle control process.

For each of the range sensors 3-1 to 3-3, the memory 22 further stores a danger area. The danger area is included in the measurement area of the corresponding range sensor and includes a position at which another vehicle traveling in an area around the vehicle 10 may collide with the vehicle 10 when the former vehicle cuts in front of the vehicle 10.

With reference to FIG. 2 again, a subarea 203a of the measurement area 203 of the range sensor 3-2 spreading from the front of the vehicle 10 to its side is a danger area. Similarly, a subarea 204a of the measurement area 204 of the range sensor 3-3 spreading from the front of the vehicle 10 to its side is a danger area. In addition, the whole measurement area 202 of the range sensor 3-1 covering the region in front of the vehicle 10 may be set as a danger area.

The processor 23 includes one or more central processing units (CPUs) and a peripheral circuit thereof. The processor 23 may further include another operating circuit, such as a logic-arithmetic unit, an arithmetic unit, or a graphics processing unit. The processor 23 executes the vehicle control process on the vehicle 10.

Figure 4:
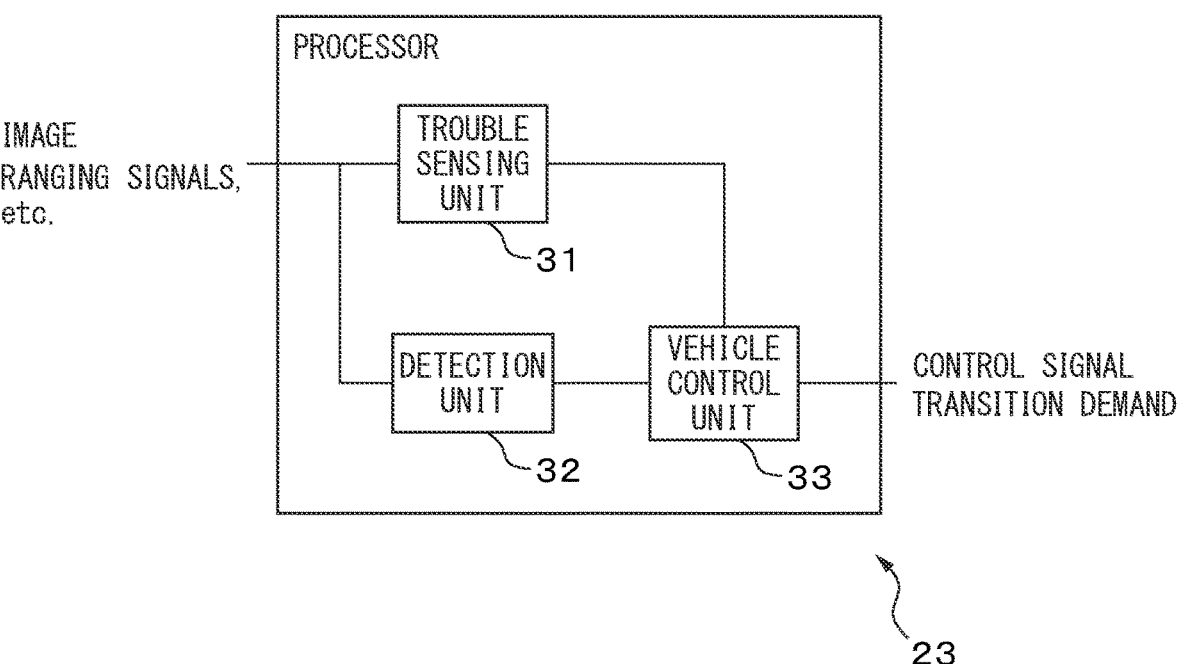
FIG. 4 is a functional block diagram of a processor of the electronic control unit, related to a vehicle control process.

FIG. 4 is a functional block diagram of the processor 23, related to the vehicle control process. The processor 23 includes a trouble sensing unit 31, a detection unit 32, and a vehicle control unit 33. These units included in the processor 23 are functional modules, for example, implemented by a computer program executed by the processor 23, or may be dedicated operating circuits provided in the processor 23.

The trouble sensing unit 31 senses trouble with the camera 2. Trouble with the camera 2 refers to the state of the camera 2 in which it is difficult to detect objects around the vehicle 10 from an image generated by the camera 2. Thus, trouble with the camera 2 includes not only the case where the camera 2 is broken down and cannot generate an image but also a temporary decrease in the accuracy of detection caused by the environment around the vehicle 10. Such environment includes the environment in which the camera 2 takes pictures against the light and the environment in which the field of view of the camera 2 is obstructed by snow or rainfall.

The trouble sensing unit 31 determines that the camera 2 has trouble, when the ECU 5 has not been able to receive an image from the camera 2 for a certain period longer than the capturing period of the camera 2 or receives a signal indicating a breakdown from the camera 2. Alternatively, the trouble sensing unit 31 may determine that the camera 2 has trouble, when an image feature that makes it difficult to detect an object (hereafter a "trouble feature"), such as a solid fill of white or black, has been represented in part or the whole of each image for a predetermined period. The predetermined period may be, for example, one to several seconds. In this case, every time an image is received from the camera 2, the trouble sensing unit 31 divides the received image into multiple blocks, and calculates a statistically representative value of luminance values, such as an average, median, or mode, for each block. When the statistically representative value of luminance values in one of the blocks is below a solid-black reference value corresponding to a solid black fill or above a solid-white reference value corresponding to a solid white fill, the trouble sensing unit 31 determines that a trouble feature is represented.

Alternatively, the trouble sensing unit 31 may determine that the camera 2 has trouble, in the case where frequency of actual detection of objects by the detection unit 32 in the most recent predetermined period is less than an expected value of frequency of detection of certain objects from time-series images obtained in the period by more than a certain degree. In this case, the expected value of frequency of detection of objects is prestored in the memory 22. Alternatively, the expected value of frequency may be calculated on the basis of a history of detection. For example, the trouble sensing unit 31 calculates the number of objects detected per unit time in past several hours as a reference detection number, based on a history of detection. The trouble sensing unit 31 determines that the camera 2 has trouble, when the number of objects detected per unit time, which is calculated from the number of objects detected in the most recent predetermined period, is less than the reference detection number multiplied by a predetermined factor less than one (e.g., 0.3 to 0.6). By checking the frequency of actual detection of objects in this way, the trouble sensing unit 31 can sense trouble with the camera 2 accurately even when images do not represent a feature indicating trouble with the camera 2.

Upon determining that the camera 2 has trouble, the trouble sensing unit 31 notifies the vehicle control unit 33 that trouble with the camera 2 is sensed.

For each sensor, the detection unit 32 detects another vehicle traveling in an area around the vehicle 10, based on a sensor signal obtained by the sensor. In the present embodiment, the detection unit 32 detects another vehicle traveling in an area around the vehicle 10 for each image obtained from the camera 2 and each ranging signal obtained from the range sensors 3-1 to 3-3. In addition to another vehicle, the detection unit 32 may further detect an object that may affect travel of the vehicle 10 for each image obtained from the camera 2 and each ranging signal obtained from the range sensors 3-1 to 3-3. Examples of such an object include road markings, such as lane-dividing lines or stop lines, various traffic signs, pedestrians, and structures on or around roads, such as guardrails. In the following, objects to be detected by the detection unit 32 (including another vehicle) will be referred to as "target objects."

For example, the detection unit 32 inputs an image obtained from the camera 2 into a classifier for object detection to detect a target object. As such a classifier, the detection unit 32 can use a deep neural network (DNN) having architecture of a convolutional neural network (CNN) type, such as Single Shot MultiBox Detector (SSD) or Faster R-CNN. Alternatively, as such a classifier, the detection unit 32 may use a DNN having architecture of a self-attention network (SAN) type, or a classifier based on another machine learning technique, such as an AdaBoost classifier. Such a classifier is trained in advance with a large number of training images representing target objects in accordance with a predetermined training technique, such as backpropagation, so as to detect target objects around the vehicle 10 from an image. The classifier outputs information for identifying an object region including a target object detected in the inputted image and information indicating the type of the detected object.

In addition, the detection unit 32 detects target objects around the vehicle 10, based on ranging signals. In this case also, the detection unit 32 inputs a ranging signal into a classifier that has been trained to detect target objects around the vehicle 10 from a ranging signal, thereby detecting target objects around the vehicle 10. As the classifier for detecting target objects from a ranging signal, the detection unit 32 can use a DNN having architecture of a CNN or SAN type. Alternatively, the detection unit 32 may detect target objects in accordance with another technique to detect an object from a ranging signal.

When another vehicle traveling in an area around the vehicle 10 is detected from a ranging signal generated by one of the range sensors 3-1 to 3-3 as a target object, the detection unit 32 determines whether the position of the detected vehicle is within the danger area set for the range sensor. The detection unit 32 compares the bearing to the vehicle detected in the ranging signal with the danger area, and determines that the position of the detected vehicle is within the danger area set for the range sensor, when the bearing is within the danger area. When the bearing is outside the danger area, the detection unit 32 determines that the position of the detected vehicle is outside the danger area set for the range sensor.

The detection unit 32 notifies the vehicle control unit 33 of the result of detection of a target object from an image obtained by the camera 2 and the results of detection of a target object from ranging signals obtained by the respective range sensors 3-1 to 3-3. When another vehicle traveling in an area around the vehicle 10 is detected on the basis of a ranging signal obtained by one of the range sensors 3-1 to 3-3, the detection unit 32 further notifies the vehicle control unit 33 of the result of determination whether the position of the detected vehicle is within the danger area.

The vehicle control unit 33 controls the speed of the vehicle 10 to maintain a target speed set for the vehicle 10 as long as the vehicle 10 can keep a predetermined distance from traveling vehicles around the vehicle 10. In addition, the vehicle control unit 33 controls components of the vehicle 10 to decelerate the vehicle 10 in the case where trouble with the camera 2 is sensed and where another vehicle is detected on the basis of a ranging signal generated by one of the range sensors 3-1 to 3-3. In particular, the vehicle control unit 33 makes second deceleration for the case where the position of the other vehicle detected from a ranging signal is within the danger area set for the range sensor that has generated the ranging signal greater than first deceleration for the case where the position of the detected vehicle is outside the danger area. For example, the first deceleration may be set at 0.1 G to 0.2 G and the second deceleration at 0.35 G. When the position of the detected vehicle is within the danger area, the vehicle control unit 33 continues deceleration at set deceleration until the speed of the vehicle 10 becomes equal to that of the detected vehicle. When the speed of the vehicle 10 becomes equal to or below that of the detected vehicle, the vehicle control unit 33 decelerates the vehicle 10 at the first deceleration. In the case where the speed of the detected vehicle is not less than that of the vehicle 10 at detection of the vehicle, the vehicle control unit 33 may decelerate the vehicle 10 at the first deceleration regardless of whether the detected vehicle is within the danger area. In this way, the vehicle control unit 33 decelerates the vehicle 10 at relatively large deceleration only when a cut-in of a detected vehicle may cause danger of a collision, which enables preventing a collision between the vehicle 10 and the detected vehicle and reducing the frequency of intense deceleration control.

The vehicle control unit 33 determines that the vehicle 10 travels as fast as another vehicle, when time-varying changes in the direction and distance from the vehicle 10 to the latter vehicle indicated by time-series ranging signals obtained from a range sensor fall below a predetermined amount. The vehicle control unit 33 determines that another vehicle is faster than the vehicle 10, when the direction from the vehicle 10 to the former vehicle shifts to the front of the vehicle 10 with the passage of time. Alternatively, the vehicle control unit 33 may determine that another vehicle is faster than the vehicle 10, in the case where the former vehicle is farther forward than the bearing orthogonal to the travel direction of the vehicle 10 and where the distance from the vehicle 10 to the former vehicle increases with the passage of time. Alternatively, the vehicle control unit 33 may determine that another vehicle is faster than the vehicle 10, in the case where the former vehicle is farther backward than the bearing orthogonal to the travel direction of the vehicle 10 and where the distance from the vehicle 10 to the former vehicle decreases with the passage of time.

The vehicle control unit 33 sets the degree of accelerator opening or the amount of braking so as to decelerate at the set deceleration. The vehicle control unit 33 then determines the amount of fuel injection according to the set degree of accelerator opening, and outputs a control signal depending on the amount of fuel injection to a fuel injector of an engine of the vehicle 10. Alternatively, the vehicle control unit 33 controls a power supply of a motor for driving the vehicle 10 so that electric power depending on the set degree of accelerator opening is supplied to the motor. Alternatively, the vehicle control unit 33 outputs a control signal depending on the set amount of braking to the brake of the vehicle 10.

Figure 5:
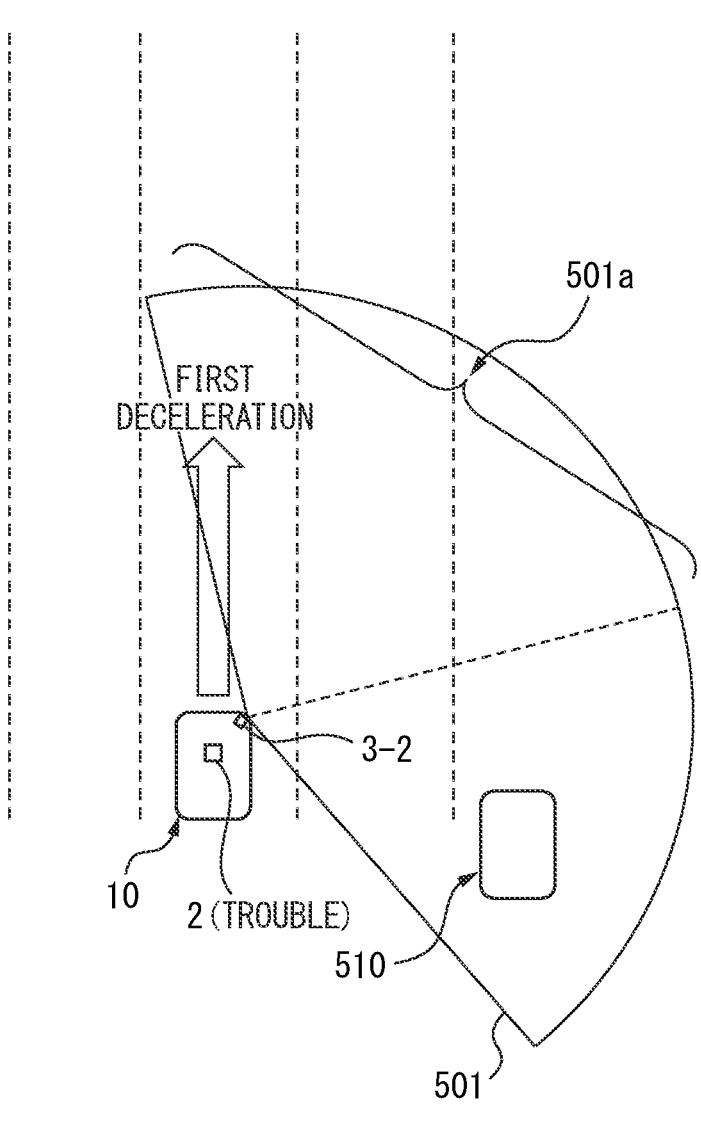
FIG. 5 illustrates an example of the relationship between deceleration set for the host vehicle and the position of another vehicle detected from a ranging signal obtained by a range sensor for the case where trouble with the camera is sensed.

FIG. 5 illustrates an example of the relationship between deceleration set for the vehicle 10 and the position of another vehicle detected from a ranging signal obtained by a range sensor for the case where trouble with the camera 2 is sensed.

In the example illustrated in FIG. 5, trouble with the camera 2 is sensed. Further, a vehicle 510 outside the danger area 501a of the measurement area 501 of the range sensor 3-2 mounted on the vehicle 10 is detected. Hence, first deceleration that is relatively small is set for the vehicle 10.

Figure 6:
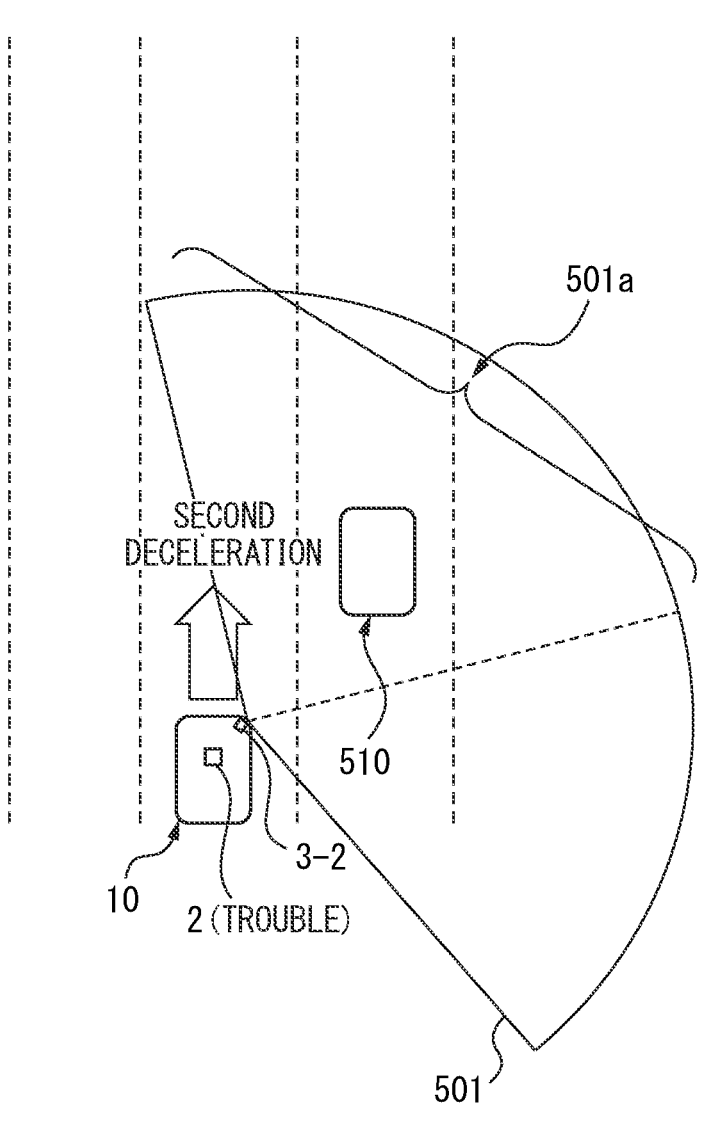
FIG. 6 illustrates another example of the relationship between deceleration set for the host vehicle and the position of another vehicle detected from a ranging signal obtained by a range sensor for the case where trouble with the camera is sensed.

FIG. 6 illustrates another example of the relationship between deceleration set for the vehicle 10 and the position of another vehicle detected from a ranging signal obtained by a range sensor for the case where trouble with the camera 2 is sensed.

In the example illustrated in FIG. 6 also, trouble with the camera 2 is sensed. In this example, a vehicle 510 within the danger area 501a of the measurement area 501 of the range sensor 3-2 mounted on the vehicle 10 is detected. Hence, second deceleration that is relatively large is set for the vehicle 10.

In the case where trouble with the camera 2 is sensed and where another vehicle is detected on the basis of a ranging signal generated by one of the range sensors 3-1 to 3-3, the vehicle control unit 33 may further request of the driver of the vehicle 10 that control of the vehicle 10 should be transferred to the driver. In the following, a request for transferring control of the vehicle 10 to the driver will be referred to as a "transition demand." Specifically, the vehicle control unit 33 causes a message or an icon indicating a transition demand to appear on a display included in a user interface (not illustrated) provided in the interior of the vehicle 10, or lights up or blinks a light source corresponding to notification of a transition demand. Alternatively, the vehicle control unit 33 outputs a voice signal representing a transition demand to a speaker included in the user interface, or vibrates a vibrator included in the user interface in a mode of vibration (period or intensity of vibration) corresponding to notification of a transition demand. In the case where the user interface includes two or more of the above-mentioned devices, the vehicle control unit 33 may notify the driver of a transition demand with all or some of the two or more devices.

After notification of a transition demand to the driver, the vehicle control unit 33 continues decelerating the vehicle 10 until the driver performs driving operation or the vehicle 10 stops. The vehicle control unit 33 determines that the driver has performed driving operation, when the accelerator or brake pedal is pressed down more than a predetermined amount. Alternatively, the vehicle control unit 33 may determine that the driver has performed driving operation, when hold of the steering wheel by the driver is sensed via a touch sensor provided in the steering or when force applied to the steering exceeds a predetermined amount.

When trouble with the camera 2 is not sensed, the vehicle control unit 33 controls the speed of the vehicle 10 to maintain a target speed set for the vehicle 10 as long as the vehicle 10 can keep a predetermined distance from moving objects around the vehicle 10. The target speed is set, for example, by operation of a button for speed setting provided in the vehicle interior. Alternatively, the target speed may be set at the regulation speed or the legally permitted speed of a road being traveled by the vehicle 10. In this case, the vehicle control unit 33 identifies the road being traveled by the vehicle 10, by referring to the current position of the vehicle 10 determined by a GPS receiver (not illustrated) provided in the vehicle 10 and a high-precision map. The vehicle control unit 33 then determines the regulation speed or the legally permitted speed set for the road being traveled by the vehicle 10, which is indicated in the high-precision map, as the target speed.

In addition, when a moving object (including another vehicle) is detected from an image obtained by the camera 2 or ranging signals obtained by the range sensors 3-1 to 3-3, the vehicle control unit 33 controls the speed of the vehicle 10 so that the distance between the detected moving object and the vehicle 10 is not less than the predetermined distance. In particular, when the detected moving object is on a lane being traveled by the vehicle 10 (hereafter a "host vehicle lane") and is traveling ahead of the vehicle 10, the vehicle control unit 33 controls the speed of the vehicle 10 so that the distance between the moving object and the vehicle 10 is not less than the predetermined distance. To achieve this, the vehicle control unit 33 determines whether a moving object detected from an image generated by the camera 2 is traveling on the host vehicle lane, based on the position of the moving object in the image. For example, the vehicle control unit 33 identifies the lane-dividing lines closest to the vehicle 10 on the left and right of the vehicle 10 of multiple lane-dividing lines detected in the image by the detection unit 32 as ones demarcating the host vehicle lane. When the bottom of the object region representing the moving object is within a region sandwiched between the two lane-dividing lines demarcating the host vehicle lane, the vehicle control unit 33 determines that the moving object is traveling on the host vehicle lane. When the bottom of the object region representing the moving object is outside the region sandwiched between the two lane-dividing lines demarcating the host vehicle lane, the vehicle control unit 33 determines that the moving object is traveling on a lane other than the host vehicle lane. In the case where a moving object is detected from a ranging signal from one of the range sensors, the vehicle control unit 33 may determine the moving object is traveling on the host vehicle lane, when the difference between the direction to the detected moving object and the travel direction of the vehicle 10 is less than a predetermined angular difference.

In addition, the vehicle control unit 33 determines whether the detected moving object is going to cut in the host vehicle lane ahead of the vehicle 10, and controls the speed of the vehicle 10 so that the distance between the moving object and the vehicle 10 is not less than the predetermined distance, when it is determined that the moving object is going to cut in the host vehicle lane. To this end, when the same moving object is detected from both an image obtained by the camera 2 and a ranging signal of one of the range sensors, the vehicle control unit 33 makes a determination of a cut-in, using the image. The position at which a moving object is represented in an image corresponds one-to-one to the direction of the moving object viewed from the camera 2. In addition, the bottom position of the object region representing the moving object in the image is assumed to correspond to the position at which the moving object touches the road surface. Thus, the vehicle control unit 33 can estimate the direction and distance from the vehicle 10 to the moving object, based on the bottom position of the object region representing the moving object and parameters such as the orientation and the mounted position of the camera 2. In view of this, the vehicle control unit 33 compares the estimated direction and distance from the vehicle 10 to the moving object with the direction and distance to the detected moving object in the ranging signal. When their difference is within a predetermined amount, the vehicle control unit 33 determines that the moving object detected from the image obtained by the camera 2 is the same as that detected from the ranging signal of one of the range sensors.

When the bottom of the object region representing the moving object crosses the lane-dividing line demarcating the host vehicle lane, the vehicle control unit 33 determines that the moving object is going to cut in the host vehicle lane. Alternatively, the vehicle control unit 33 may input the object region representing a moving object determined to be traveling on a lane other than the host vehicle lane into an indicator classifier that identifies the state of lighting of direction indicators. In this way, the vehicle control unit 33 may determine whether a direction indicator of the moving object is blinking. When the direction indicator on the side of the host vehicle lane is blinking, the vehicle control unit 33 determines that the moving object is going to cut in the host vehicle lane. As the indicator classifier, the vehicle control unit 33 can use a DNN of a CNN type or a recurrent neural network (RNN). When an RNN is used as the indicator classifier, the vehicle control unit 33 inputs object regions respectively detected from time-series images into the indicator classifier in chronological order. In this case, the vehicle control unit 33 associates the object regions representing the same moving object detected over multiple images with each other, using a tracking technique, such as the KLT algorithm.

Further, the vehicle control unit 33 determines whether a moving object detected from a ranging signal of one of the range sensors but not from an image obtained by the camera 2 is going to cut in the host vehicle lane, based on the direction and distance to the moving object. For example, the vehicle control unit 33 determines that the detected moving object is going to cut in the host vehicle lane, in the case where the angular difference between the direction to the moving object and the travel direction of the vehicle 10 falls below a predetermined angle and where the distance to the moving object is not greater than a predetermined threshold distance.

When the distance to a moving object traveling ahead of the vehicle 10 or a moving object that is going to cut in front of the vehicle 10 is not less than the predetermined distance, the vehicle control unit 33 controls components of the vehicle 10 so that the speed of the vehicle 10 is equal to a target speed. When the distance to the moving object is less than the predetermined distance, the vehicle control unit 33 controls components of the vehicle 10 to decelerate the vehicle 10. To this end, the vehicle control unit 33 may increase the deceleration as the distance to the moving object decreases. However, the vehicle control unit 33 sets the deceleration below a predetermined upper-limit deceleration.

Figure 7:
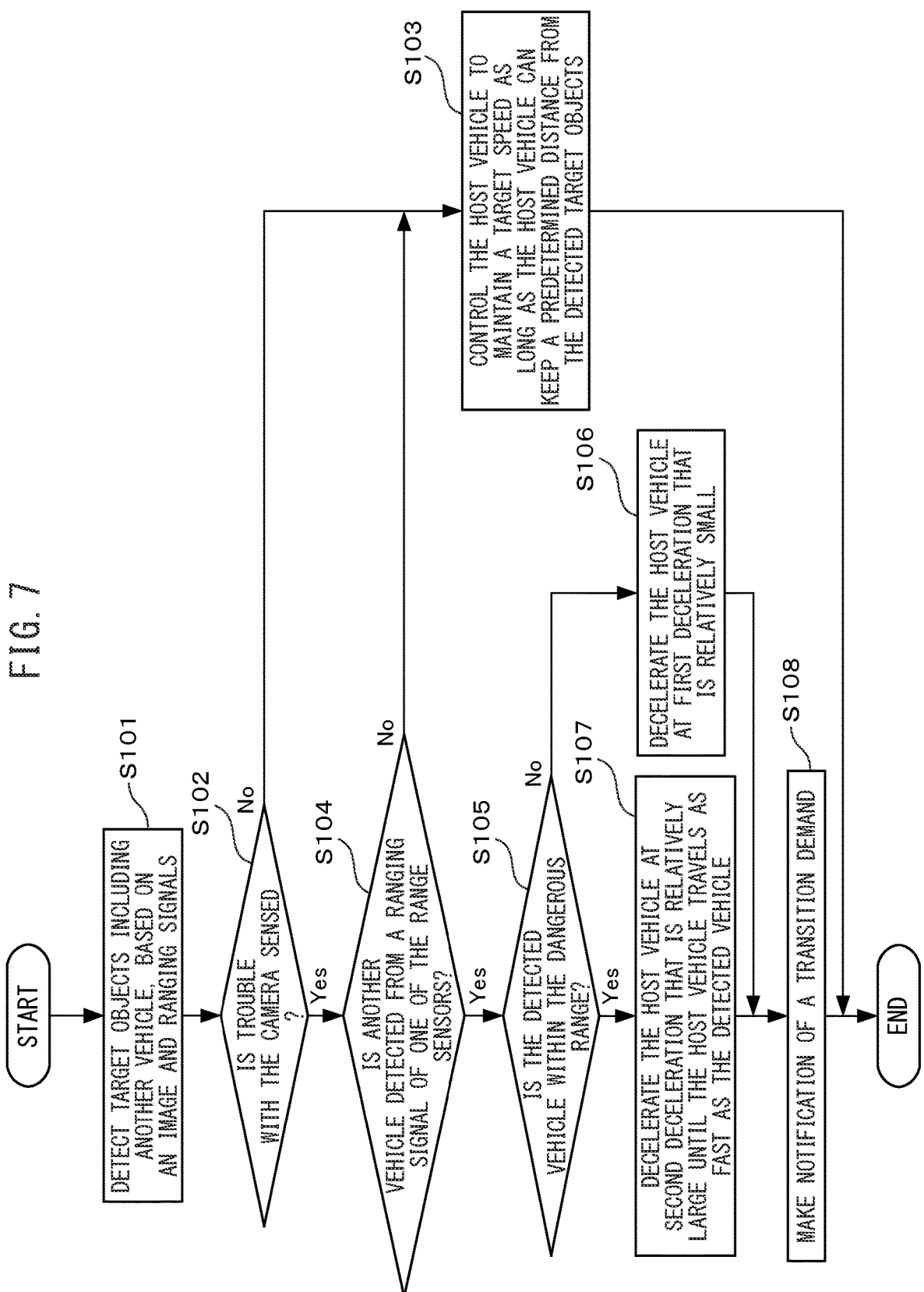
FIG. 7 is an operation flowchart of the vehicle control process.

FIG. 7 is an operation flowchart of the vehicle control process executed by the processor 23. The processor 23 executes the vehicle control process at predetermined intervals in accordance with the operation flowchart described below.

The detection unit 32 of the processor 23 detects target objects including another vehicle traveling in an area around the vehicle 10, based on an image obtained by the camera 2 and ranging signals obtained by the range sensors 3-1 to 3-3 (step S101). The trouble sensing unit 31 of the processor 23 determines whether trouble with the camera 2 is sensed (step S102).

When trouble with the camera 2 is not sensed (No in step S102), the vehicle control unit 33 of the processor 23 controls the vehicle 10 to maintain a target speed, as long as the vehicle 10 can keep a predetermined distance from the detected target objects, in particular, a moving object (step S103).

When trouble with the camera 2 is sensed (Yes in step S102), the vehicle control unit 33 determines whether another vehicle traveling in an area around the vehicle 10 is detected by the detection unit 32 from a ranging signal of one of the range sensors 3-1 to 3-3 (step S104). When no vehicle is detected from ranging signals of the range sensors (No in step S104), the vehicle control unit 33 executes processing of step S103.

When another vehicle is detected from a ranging signal of one of the range sensors 3-1 to 3-3 (Yes in step S104), the vehicle control unit 33 determines whether the detected vehicle is within the danger area (step S105). When the detected vehicle is outside the danger area (No in step S105), the vehicle control unit 33 decelerates the vehicle 10 at first deceleration that is relatively small (step S106).

When the detected vehicle is within the danger area (Yes in step S105), the vehicle control unit 33 decelerates the vehicle 10 at second deceleration that is relatively large until the vehicle 10 travels as fast as the detected vehicle (step S107).

After step S106 or S107, the vehicle control unit 33 notifies the driver of a transition demand via the user interface provided in the vehicle interior (step S108). The vehicle control unit 33 may execute processing of step S108 together with processing of step S106 or S107.

After step S103 or S108, the processor 23 terminates the vehicle control process.

As has been described above, the vehicle controller detects another vehicle traveling in an area around the host vehicle, using the first sensor having higher priority and the second sensor having lower priority in sensing another vehicle cutting in front of the host vehicle. In addition, the vehicle controller decelerates the host vehicle in the case where trouble with the first sensor is sensed and where the vehicle is detected on the basis of a sensor signal from the second sensor.

According to a modified example, the trouble sensing unit 31 may sense trouble with the range sensors 3-1 to 3-3 as well as trouble with the camera 2. For example, when the trouble sensing unit 31 has not been able to receive a ranging signal from one of the range sensors for a predetermined period or receives a signal indicating a breakdown, the trouble sensing unit 31 determines that the range sensor has trouble. In the case where trouble with one of the range sensors is sensed and where trouble with the camera 2 is not sensed, the vehicle control unit 33 may make notification of a transition demand via the user interface without deceleration control of the vehicle 10.

The computer program for achieving the functions of the processor 23 of the ECU 5 according to the embodiment or modified example may be provided in a form recorded on a computer-readable portable storage medium, such as a semi-conductor memory, a magnetic medium, or an optical medium.

As described above, those skilled in the art may make various modifications according to embodiments within the scope of the present disclosure.

What is claimed is:

1. A vehicle controller comprising:
a processor configured to:
set a trouble flag associated with a first sensor among sensors that are capable of detecting objects around a host vehicle and whose sensing areas at least partially overlap in response to one or more cases being true:
in a first case:
detect another vehicle traveling in an area around the host vehicle, based on sensor signals from the respective sensors, and
decelerate the host vehicle at a first deceleration where the other vehicle is detected on a basis of a sensor signal from a second sensor having lower priority than the first sensor in sensing the other vehicle cutting in front of the host vehicle among the sensors,
in a second case:
detect predetermined objects including the other vehicle, based on the sensor signals obtained from the first sensor, and
where a frequency of detection of the predetermined objects in a most recent predetermined period is less than an expected value of the frequency of detection of the predetermined objects from the sensor signals that are time-series signals obtained from the first sensor in the predetermined period by more than a predetermined amount.

2. The vehicle controller according to claim 1, further comprising a memory configured to store an area included in the sensing area of the second sensor and including a position at which the other vehicle collides with the host vehicle at a cut-in of the other vehicle, the area including a subarea of a measurement area of a range sensor spreading from a front of the vehicle to a side of the vehicle, wherein
where the position of the other vehicle is within the area, the processor is further configured to decelerate the host vehicle at a second deceleration greater in magnitude than the first deceleration until the other vehicle travels as fast as the host vehicle; and
where the position of the other vehicle is outside the area, the processor is further configured to decelerate the host vehicle at the first deceleration.

3. The vehicle controller according to claim 2, wherein the processor is further configured to decelerate the host vehicle at the first deceleration after a speed of the host vehicle falls below a speed of the other vehicle in the area.

4. A method for vehicle control, comprising:
setting a trouble flag associated with a first sensor among sensors that are capable of detecting objects around a host vehicle and whose sensing areas at least partially overlap in response to one or more cases being true:
in a first case:
detecting another vehicle traveling in an area around the host vehicle, based on sensor signals from the respective sensors; and
decelerating the host vehicle at a first deceleration where the other vehicle is detected on a basis of a sensor signal from a second sensor having lower priority than the first sensor in sensing the other vehicle cutting in front of the host vehicle among the sensors;
in a second case:
detecting predetermined objects including the other vehicle, based on the sensor signals obtained from the first sensor; and
where a frequency of detection of the predetermined objects in a most recent predetermined period is less than an expected value of the frequency of detection of the predetermined objects from the sensor signals that are time-series signals obtained from the first sensor in the predetermined period by more than a predetermined amount.

5. A non-transitory recording medium that stores a computer program for vehicle control, the computer program causing a processor mounted on a host vehicle to execute a process comprising:
setting a trouble flag associated with a first sensor among sensors that are capable of detecting objects around a host vehicle and whose sensing areas at least partially overlap in response to one or more cases being true:
in a first case:
detecting another vehicle traveling in an area around the host vehicle, based on sensor signals from the respective sensors; and
decelerating the host vehicle at a first deceleration where the other vehicle is detected on a basis of a sensor signal from a second sensor having lower priority than the first sensor in sensing the other vehicle cutting in front of the host vehicle among the sensors;
in a second case:
detecting predetermined objects including the other vehicle, based on the sensor signals obtained from the first sensor; and
where a frequency of detection of the predetermined objects in a most recent predetermined period is less than an expected value of the frequency of detection of the predetermined objects from the sensor signals that are time-series signals obtained from the first sensor in the predetermined period by more than a predetermined amount.

6. The vehicle controller according to claim 1, wherein the first sensor includes a camera that has priority over the second sensor among the sensors of the host vehicle.

7. The vehicle controller according to claim 6, wherein the processor is further configured to set the trouble flag where the first sensor cannot generate an image as well as a decrease in an accuracy of detection caused by an environment around the host vehicle, the environment corresponding to the camera taking images against the light and also in which a field of view of the camera is obstructed.

8. The vehicle controller according to claim 1, wherein the processor is further configured to set the trouble flag when the processor does not receive an image from the first sensor within a predetermined period of time or receives a signal from the first sensor.

9. The vehicle controller according to claim 1, wherein the processor is further configured to input an image obtained from the first sensor into a classifier to detect the other vehicle.

10. The vehicle controller according to claim 1, wherein the processor is further configured to control a speed of the host vehicle and keep a predetermined distance from traveling vehicles, including the other vehicle, around the host vehicle.

11. The vehicle controller according to claim 2, wherein the processor is further configured to set the trouble flag associated with the second sensor, and in a case where the processor is configured to not set the trouble flag associated with the first sensor and set the trouble flag associated with the second sensor, the processor is further configured to notify a driver of the host vehicle of a transition demand via a user interface provided in the host vehicle.

\* \* \* \* \*